(No Model.)

F. LOUSAW & T. E. CLARKE.
INSECT POWDER DUSTING MACHINE.

No. 531,320. Patented Dec. 25, 1894.

Witnesses
Jas. Edmunds
S. McBain

Inventors,
Francis Lousaw,
Thomas E. Clarke
By P. J. Edmunds
Attorney

UNITED STATES PATENT OFFICE.

FRANCIS LOUSAW AND THOMAS E. CLARKE, OF BOTHWELL, CANADA.

INSECT-POWDER-DUSTING MACHINE.

SPECIFICATION forming part of Letters Patent No. 531,320, dated December 25, 1894.

Application filed January 11, 1894. Serial No. 496,566. (No model.)

*To all whom it may concern:*

Be it known that we, FRANCIS LOUSAW and THOMAS E. CLARKE, subjects of the Queen of Great Britain, and residents of Bothwell, in the Province of Ontario, Canada, have jointly invented a new and useful Distributer for Paris-Green, Plaster, &c., of which the following specification, taken in connection with the accompanying drawings, forms a full, clear, and exact description.

This invention relates to a machine for spreading any powdered substance, and in any desired quantity evenly over a large area or surface, and it is particularly adapted for spreading paris green, &c., on potato plants, and plaster, &c., on root crops; and it consists of the improved construction and combination of parts of the same, as will be hereinafter first fully set forth and described, and then pointed out in the claim.

Figure 1:
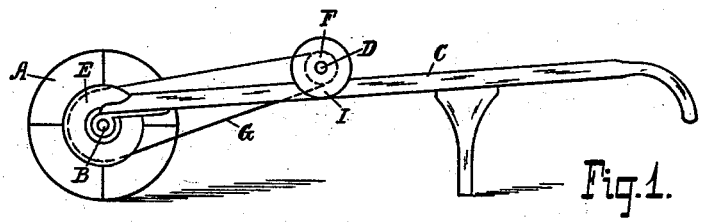
Figure 2:
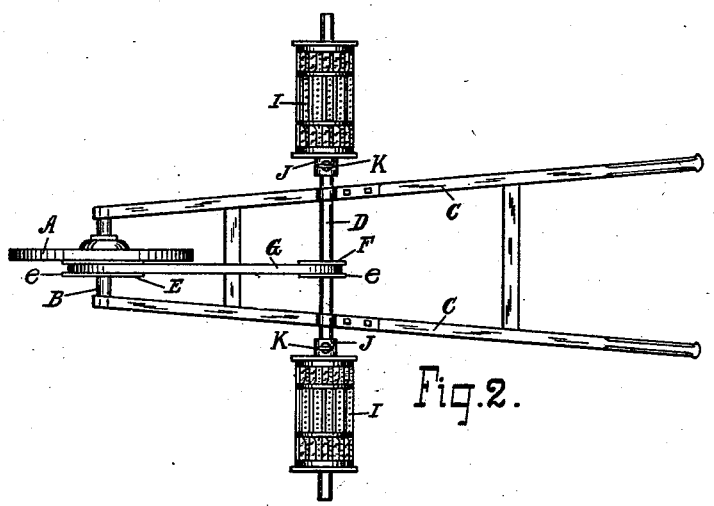
Figure 3:
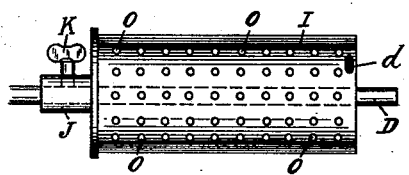
Figure 4:
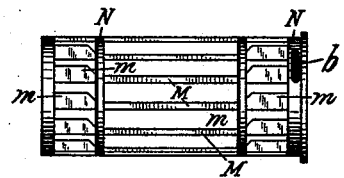
Figure 5:
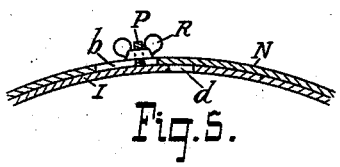

Reference being had to the accompanying drawings, Figure 1. is a side elevation of a machine, embodying our invention. Fig. 2. is a plan view of same. Fig. 3. is an enlarged detail plan view of one of the perforated holders, and the adjacent portion of its supporting shaft. Fig. 4. is an enlarged detail plan view of a slatted cover which surrounds each holder. Fig. 5. is an enlarged detail cross sectional view of a portion of the holder and cover, showing one means by which the cover is securely held at the position to which it is adjusted.

A, designates the driving wheel; B, the axle on which said wheel revolves, and C the frame of the machine. This axle, B, may be supported in bearings, formed in, or secured to said frame, C, as preferred.

D, designates a shaft, supported in bearings, also formed in or secured to said frame, C, as preferred.

E, designates a pulley, rigidly secured to the wheel, A; and F, a pulley rigidly secured to the shaft, D; and G, is a belt passing over the pulleys, E, F, by which motion is communicated from axle, B, to shaft, D, and attachments; or a chain belt and sprocket wheels, or any suitable means may be used to communicate motion from axle, B, to shaft, D. When the pulleys, E, F, are used, one or both of them may be formed with flanges, $e$, to guide and hold the belt, G, thereon when in operation.

I, I, designate perforated holders, which may be formed of any suitable size or shape, and of any suitable material, but they are preferably formed cylindrical, as shown in the accompanying drawings. These holders, I, are adjustably secured to the shaft, D, by any means found most suitable or convenient under the circumstances.

As shown in the accompanying drawings, the holders, I, as well as a collar, J, rigidly secured to, or forming part of each holder, encircle the shaft, D, and the collar, J, is provided with a thumb screw, K, so that by tightening the latter on the shaft, D, the holders, I, are rigidly held in place to revolve with the shaft, D; and by loosening said thumb screw, K, the holders may be adjusted at any required distance apart on said shaft, D, according to the distance between the rows of potato plants, root crops, &c.

N, N, designate endless bands, encircling the holders, I, and secured to said bands, N, are the slats M, M, formed with extended portions, $m$, $m$; and there are the same number of slats as there are longitudinal rows of perforations, O, in the holder, I, and the slats are the same proportionate distance apart as are said perforations, O, so that by adjusting said endless bands, N, N, around the circumference of said holder, I, the slats, M, may be adjusted to partly or completely cover the perforations, O, in said holder. This regulates the feed or the quantity of powder passing out of said holders, I, or these endless bands, N, and slats, M, may be in the form of a sleeve, cover or supplemental cylinder formed with slots, corresponding to the openings between the slats and said endless bands, and they may be adjusted around the circumference or lengthwise on the holder, I, as preferred.

$d$, and $b$, designate slots in the holder, I, and one of the endless bands, N, respectively.

P, designates a screw threaded bolt, one end of which is rigidly secured to the holder, I; and the slot, $b$, in the endless band, N, is formed elongated, through which slot, the screw threaded bolt, P, projects; and R, is a thumb nut, which is turned on the bolt, P, which thumb nut when tightened, rigidly secures and binds the slatted cover on the holder, I, in any desired position to which it may be adjusted; and this bolt, P, may be secured to the side or end of the holder, as preferred.

The operation of this invention is as follows: The holders, I, are first adjusted the required distance apart on the shaft, D, so that they will come directly over the potato plants, if it is desired to use the machine as a paris green distributer. After adjusting the holders, I, the required distance apart, the slots $b$, and $d$, in the cover and holder respectively, are adjusted opposite one another, through which openings, the holder is filled with the paris green. Then by adjusting the cover until the opening, $b$, is opposite a solid portion of the holder, the opening in the latter will be completely covered by the solid portion of the band, N, as shown in Fig. 5, to completely prevent the escape of the contents of the holder at the opening, $d$. If it is required to distribute the paris green over a surface equal to the full length of the holder, the slats, M, together with their extensions, $m$, are adjusted to come between the longitudinal rows of the perforation, O, of said holder; and if it is found that this spreads the paris green over too wide a surface, the slats, M, are adjusted around the holder, until the extended portions, $m$, only, are adjusted over the perforations in line with them, these extensions, $m$, closing only the end perforations independent of, and without interfering with the central perforations; after which, the holder may be adjusted, so that the central perforations will come over the desired surface on which it is required to distribute the paris green. Then by grasping the handle ends of the frame, the machine can be readily and easily moved forward on the wheel, A, and as the latter revolves, the pulley, E, also revolves, as well as the pulley, F, and shaft, D; and the holder, I, being rigidly secured to the shaft, D, said holder also revolves and agitates the paris green held therein, to deliver it freely and evenly, and in any desired quantity through the perforations, O, on to the potato tops, or any powdered substance contained in the holder, I, over any surface required.

Having thus described our invention, we claim—

An insecticide distributer consisting of a rotatively mounted perforated cylindrical holder having at one end a screw and a filling aperture and at the other end a circumferential ridge or flange, in combination with a perforated cylindrical cover closely fitting said cylindrical holder and adapted to abut at one end against the flange thereof, the other end of said cover having a slot adapted to permit the passage of said screw and also to be brought into register with the filling aperture, and a nut on said screw whereby when adjusted, said cover may be locked in position, substantially as set forth.

In testimony whereof we have signed in the presence of the two undersigned witnesses.

FRANCIS $\overset{\text{his}}{\times}$ LOUSAW.
THOMAS E. $\overset{\text{mark}}{}$ CLARKE.

Witnesses:
CHAS. E. BAYLEY,
W. R. HICKEY.